Dec. 19, 1933.    J. S. Y. FRALICH ET AL    1,939,889
BRAKE CYLINDER PISTON SLEEVE
Filed Sept. 9, 1931
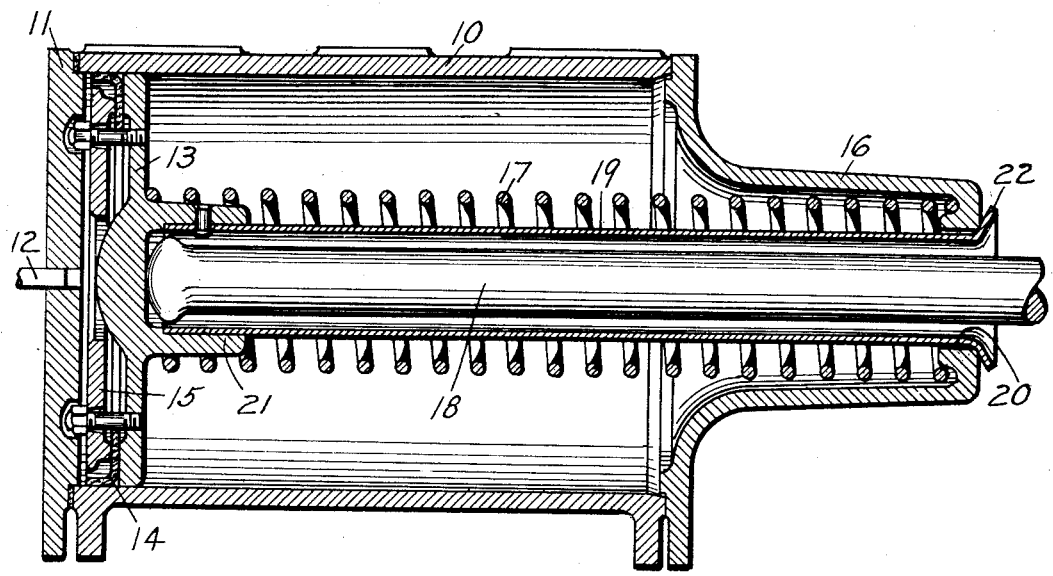
INVENTOR.
JOHN S. Y. FRALICH
AND
CLYDE C. FARMER
BY
*Wm. M. Cady*
ATTORNEY.

Patented Dec. 19, 1933

1,939,889

UNITED STATES PATENT OFFICE 1,939,889

BRAKE CYLINDER PISTON SLEEVE

John S. Y. Fralich, Chicago, Ill., and Clyde C. Farmer, Pittsburgh, Pa., assignors to The Westinghouse Air Brake Company, Wilmerding, Pa., a corporation of Pennsylvania Application September 9, 1931. Serial No. 561,832

4 Claims. (Cl. 60—62.6)

This invention relates to fluid pressure brakes and more particularly to an improved brake cylinder construction.

One object of the present invention is the provision of an improved brake cylinder assembly which will facilitate the removal of the piston, piston spring and non-pressure head of the cylinder as a unit to permit ready inspection or cleaning of the brake cylinder.

Another object is the provision in a brake cylinder of improved means for reinforcing the end of the hollow piston rod to prevent faulty operation of the brake cylinder piston due to distortion of the hollow piston rod.

A further object resides in the provision of improved means on the piston rod sleeve for preventing the admission of foreign matter into the brake cylinder when the brake cylinder piston is in release position.

A more specific object is the provision of an improved stop means on the piston rod sleeve for preventing engagement of the piston with the pressure head when the brake cylinder piston is shifted to release position.

Other objects and advantages will appear from the following description of an illustrative embodiment of the present invention.

In the drawing, the single figure is a longitudinal midsectional view through a brake cylinder constructed in accordance with the teachings of the present invention.

The device chosen for illustrative purposes in the accompanying drawing comprises a brake cylinder 10 having the usual pressure head 11 at one end and the non-pressure head 16 at the opposite end and containing the usual brake cylinder piston 13 provided with the usual cup packing ring 14 and follower 15. Fluid under pressure is applied to and released from the pressure side of the brake cylinder piston 13 through a pipe 12. The usual release spring 17 is interposed between the piston 13 and the non-pressure head 16. A hollow piston rod or sleeve 19 is secured in a hollow boss 21 carried by the piston 13 and a push rod 18 is disposed within the sleeve in the usual manner.

According to our invention, an outwardly directed flange 22 is formed on the outer end of the sleeve 19. This flange serves a four-fold purpose as set forth in the objects and provides a simple and effective means for greatly facilitating assembly and maintenance, and insuring durability of the equipment.

In order to carry out the teachings of the present invention, a sub-assembly of the piston 13, non-pressure head 16, release spring 17, and hollow piston rod 19 is preferably made prior to the application of the piston 13 to the cylinder 10.

After the sub-assembly has been completed, the release spring 17 is compressed by moving the non-pressure head 16 toward the piston 13 a sufficient distance to permit the proper application of a suitable tool to the portion of the hollow piston rod 19 which extends beyond the non-pressure head 16. With the tool or die properly positioned on the rod 19, the flange 22 may be formed on the end of the rod in any approved manner such as stamping or spinning. When the flange 22 has been formed it will readily be seen that it precludes the removal of the non-pressure head 16 from the rod 19. The action of the release spring 17 normally tends to retain the flange 22 in abutting relation with the edge of the hole 20 formed in the non-pressure head 16 to limit the inward movement of the piston 13.

The piston 13 may then be inserted into the cylinder 10 and the non-pressure head may be secured to the cylinder in the usual manner to complete the cylinder assembly. The push rod 18 of the usual brake rigging may then be inserted through the hollow piston rod 19 so as to act upon the piston 13 in the usual way.

A brief statement of the advantages afforded by the inclusion of the flange 22 or other similar device will serve to accentuate its importance in provision of an improved brake cylinder construction which overcomes disadvantages found in prior devices.

Firstly, the flange 22 provides a means for effecting a sub-assembly of the piston 13 and its associated parts. The fact that the piston and non-pressure head 16 may be removed and replaced as a unit greatly facilitates inspection and cleaning of the brake cylinder wall, as the labor entailed is reduced to a minimum.

Secondly, the flange 22 serves to reinforce the end of the hollow piston rod 19 in such a manner as to virtually preclude its being distorted. Freedom of the piston rod from distortion insures the proper brake cylinder piston movement. In prior devices the end of the hollow piston rod was not reinforced and consequently was frequently so distorted from bumps or impacts as to preclude its free movement through the non-pressure head and thus impair free movement of the brake cylinder piston.

Thirdly, the flange 22 forms an abutment means for limiting the inward movement of the piston 13 when air is released from the cylinder and thus provides a simple and effective means for insuring the desired clearance between the piston and cylinder head to obtain complete release of the brakes without permitting the piston to actually contact with the pressure head of the cylinder.

Fourthly, the flange 22, in contacting with the non-pressure head 16, effectively serves as a seal to prevent the admission of dust or foreign matter into the brake cylinder when the brakes are in release position whether the car be standing or moving.

By employing a conical flange formed as an integral part of the hollow piston rod, the pressure of the spring 17, when the piston rod is in its normal release position, acts through the piston rod to press the flange both radially and longitudinally against the outer end of the non-pressure head. By this means, the hollow piston rod is automatically centered and provides an effective seal against the entrance of dirt.

While the invention has been described in considerable detail in the foregoing specification, it is understood that various changes may be made in its embodiment without departing from, or sacrificing any of the advantages as hereinafter claimed.

Having now described our invention, what we claim as new and desire to secure by Letters Patent, is:

1. The combination with a brake cylinder having a non-pressure head and piston in said cylinder, of a hollow piston rod associated with said piston and projecting through said head and provided with an outer conically flanged end.

2. The combination with a brake cylinder having a non-pressure head and piston in said cylinder, of a hollow piston rod associated with said piston and projecting through said head, an outwardly directed conical flange on the end of said hollow piston rod, said flange adapted to abut with the non-pressure head to limit the inward movement of said piston rod through said non-pressure head.

3. The combination with a brake cylinder having a non-pressure head and piston in said cylinder, of a hollow piston rod associated with said piston and projecting through said head, an outwardly directed conical flange on the end of said hollow piston rod, said flange forming a stop to retain said non-pressure head on said rod and adapted to abut said non-pressure head to limit the inward movement of said piston within the cylinder.

4. The combination with a brake cylinder having a non-pressure head and piston in said cylinder, of a hollow piston rod associated with said piston and projecting through said head, an outwardly directed conical flange on the end of said hollow piston rod, said flange forming a stop to retain said non-pressure head on said rod and adapted to abut said non-pressure head to limit the inward movement of said piston within the cylinder, said flange further serving in its abutting position as a dust excluding means to preclude the admission of foreign matter into the cylinder.

JOHN S. Y. FRALICH.
CLYDE C. FARMER.